Jan. 23, 1934.  W. E. HUFFMAN  1,944,180
FLIGHT TRAINER
Filed Nov. 17, 1932  3 Sheets-Sheet 1
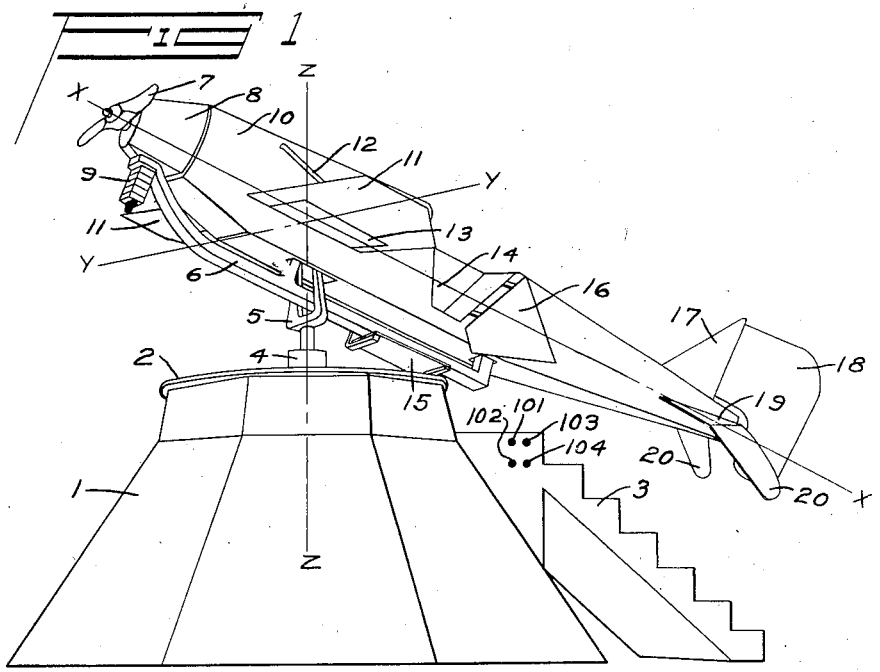
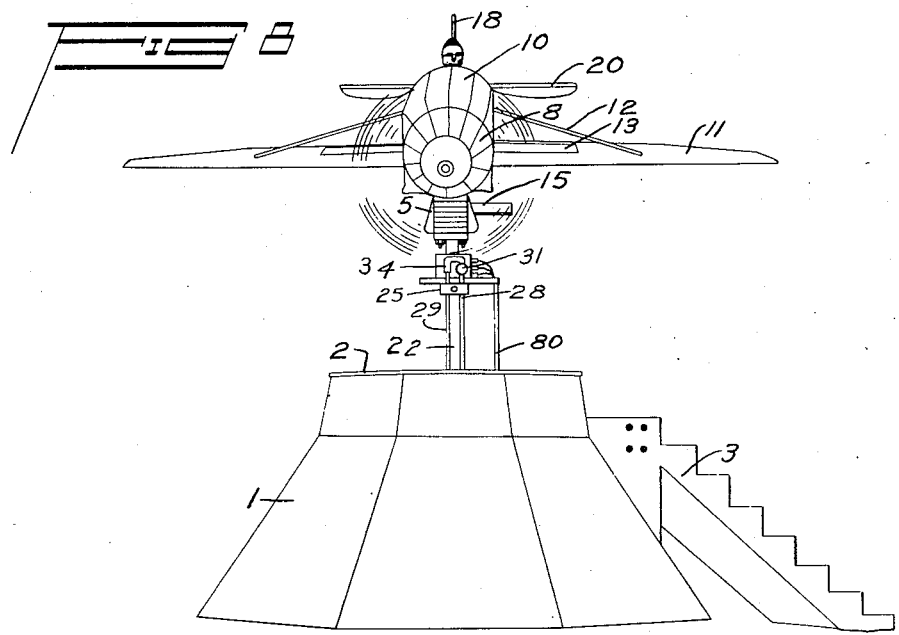
INVENTOR
WILLIAM E. HUFFMAN
ATTORNEYS

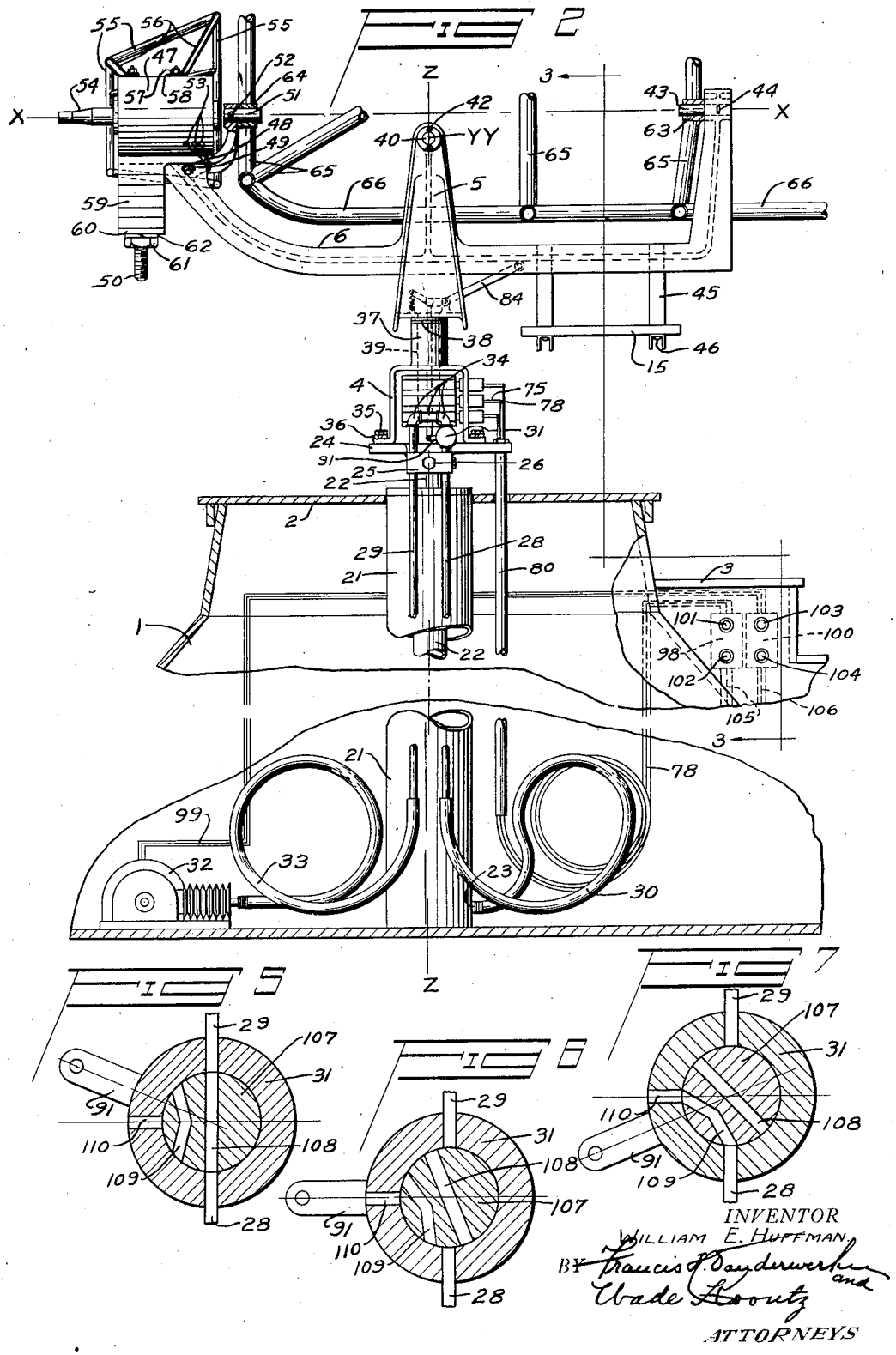

Jan. 23, 1934.  W. E. HUFFMAN  1,944,180
FLIGHT TRAINER
Filed Nov. 17, 1932  3 Sheets-Sheet 3
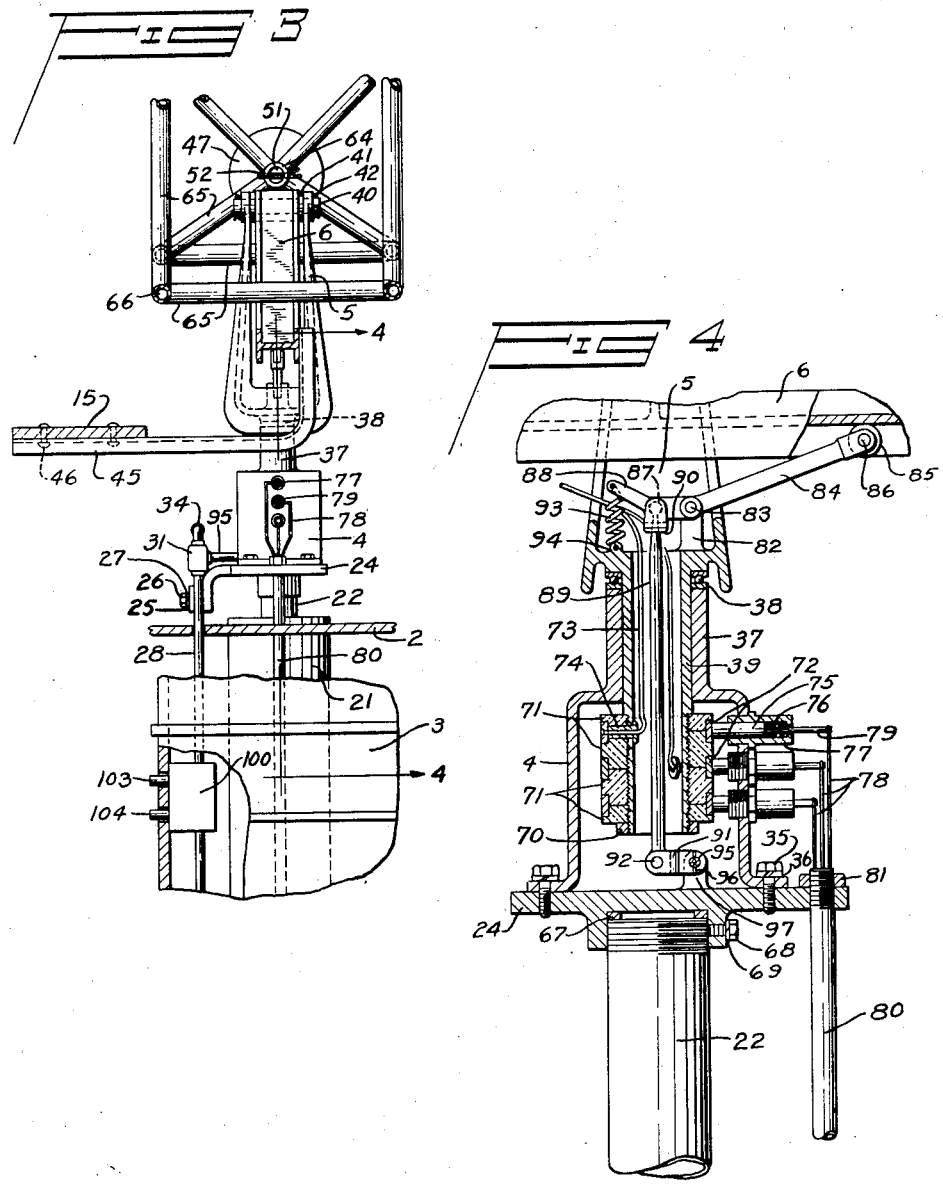
INVENTOR
WILLIAM E. HUFFMAN.
BY Francis H. Vanderwerker
and
Wade Koontz
ATTORNEYS Patented Jan. 23, 1934

1,944,180

UNITED STATES PATENT OFFICE 1,944,180

FLIGHT TRAINER

William E. Huffman, Dayton, Ohio

Application November 17, 1932
Serial No. 643,058

20 Claims. (Cl. 35—12)

(Granted under the act of March 3, 1883, as
amended April 30, 1928; 370 O. G. 757)

The invention described herein may be manufactured and used by or for the Government for governmental purposes, without the payment to me of any royalty thereon.

My invention relates to an aerodynamic apparatus commonly referred to as a flight trainer, which has for its principal object the simulation of the movements of an airplane during flight.

It is an object of my invention to impart to members of the general public or to students engaged in the preliminary stages of flight training certain of the sensations which are experienced during actual flight of an airplane.

It is a further object of my invention to add to the sensations of ascending, banking, turning, diving, zooming or descending in an apparatus closely resembling an airplane, the sensations produced by the slipstream of an airplane propeller during sustained flight.

It is a still further object of my invention to impart to the operator a feeling of security in order that his entire attention may be devoted to a study of the various movements which an airplane may be made to execute in response to certain predetermined manipulations of motor or air controls.

With the foregoing and other objects in view, which will appear as the description proceeds, the invention consists of certain new and noval arrangement of parts which will be hereinafter more fully described.

Referring to the drawings, in which numerals of like character designate similar parts throughout the several views:

Fig. 1 is a three-quarter front view of the flight trainer awaiting entry of occupant;

Fig. 2 is a partial cross-section of the primary fuselage structure, the movable supports and the fixed support;

Fig. 3 is a cross-section of Fig. 2 taken on the line 3—3;

Fig. 4 is a partial cross-section of Fig. 3 taken on the line 4—4;

Figs. 5 through 7 represent diagrammatically certain adjustments of a fluid control valve; and Fig. 8 is a front view of the flight trainer in an attitude of power dive.

In Fig. 1 a fixed support 1 is provided at its top with a platform 2 and at one side with steps 3. A fluid hoist, not shown in Fig. 2, is centrally and fixedly attached to the support 1. The aforementioned hoist is provided with a piston and piston rod, not shown in Fig. 2. The upper extremity of the piston rod is fixedly attached to a mounting base, not shown in Figs. 2 through 4. A bracket 4 is fixedly attached to the top surface of the aforementioned mounting base, the longitudinal axes of said hoist, piston, rod and bracket being coaxial with the vertical axis z—z of the support. The upper extremity of the base 4 is cylindrically shaped and acts as a bearing for the journaled lower extremity of a fork-shaped vertical member 5. The upper extremity of the forked member 5 is pivotally attached to the upper inner portion of an E-shaped horizontal member 6. The E-shaped member 6 is thus free to rotate vertically about the axis z—z and to pivot or pitch to a restricted degree about a lateral axis y—y. There is fixedly attached to the forward or left extremity of the E-shaped member 6 an electric motor, shown in Fig. 2, upon which is mounted a propeller 7 and a cowling 8. There is also detachably secured to the aforementioned extremity of the E-shaped member 6 a counterweight 9. A fuselage 10 is pivotally secured about its longitudinal axis x—x to the upper fore-and-aft extremities of the E-shaped member 6. To the forward end of the fuselage 10 are fixedly attached the right and left panels of a wing 11 and brace struts 12. Ailerons 13 are pivotally attached to the inner portion of the wing 11. An operator's cockpit 14 is provided just aft of the wing 11. The cockpit 14 is entered by means of a step 15 and a door 16. The aft portion of the fuselage 10 is further provided with a fin 17, a rudder 18, a stabilizer 19 and elevators 20. The last-named control surfaces and the ailerons 13 are connected with conventional airplane controls located within the cockpit 14.

In Fig. 2 the longitudinal axis x—x of the fuselage 10 has been arbitrarily positioned parallel to the platform 2 of the fixed support 1. The support is cut away to show a pneumatic hoist 21 centrally disposed therein. A piston rod 22, disposed within the hoist 21, is extended or contracted by introduction or escapage of air into or from an opening 23 in the base of the hoist 21. A mounting base 24 is fixedly attached to the upper extremity of the piston rod 22. A portion of one side of the base 24 is extended to form a bracket to which are clamped pipes 28 and 29 by means of a plate 25, a cap screw 26 and a lock washer 27, shown in Fig. 3. The lower extremity of the pipe 28 is connected to the opening 23 by means of a flexible hose 30. The upper extremity of the pipe 28 is connected to the lower opening of a fluid control valve 31. The lower extremity of the pipe 29 is connected to an air compressor unit 32 by means of a flexible hose 33. The upper extremity of the pipe 29 is connected to the upper opening of the valve 31 by means of pipe fittings 34. The bracket 4 is fixedly secured to the top surface of the base 24 by means of cap screws 35 and lock washers 36, shown in Fig. 4. The upper extremity of the bracket 4 forms a vertical bearing 37. Following placement of a thrust bearing 38 upon the top of the vertical bearing 37, the lower extremity of the forked member 5, comprising a journal 39, is inserted within the bearing 37. The forked member 5 is thus free to rotate about the axis z—z, which also constitutes the normal or vertical axis of the fuselage 10. The upper inner portion of the E-shaped member 6 is pivotally secured to the upper extremity of the forked member 5 by means of a journal 40, spacing washers 41, shown in Fig. 3, and cotter pins 42. The E-shaped member 6 is thus free to partially rotate about the horizontal axis y—y, which also constitutes the lateral axis of the fuselage 10. A journal 43 is fixedly secured to the upper portion of the aft or right extremity of the E-shaped member 6 by means of the cotter pin 44. The step 15 is fixedly secured to brackets 45 by means of rivets 46. The brackets 45 are fixedly secured to the lower portion of the aforementioned extremity of the E-shaped member 6 by welding or other suitable means. An electric motor 47 is fixedly secured to the upper portion of the forward or left extremity of the E-shaped member 6 by means of cap screws 48 and lock washers 49. There are also fixedly attached to the aforementioned extremity of the E-shaped member 6 at its forward portion studs 50 and at its aft portion a journal 51 held from rotation by a cotter pin 52. The motor 47 is provided with electrical terminals 53 and a shaft 54 upon which the propeller 7 is mounted. The motor 47 is encased in a cowling 8 supported by the formers 55. The formers 55 are secured to the motor 47 by means of the brackets 56, cap screws 57 and lock washers 58. The counterweight 9 is made up of a plurality of weights 59 rigidly secured together by means of studs 50, a cross-bar 60, nuts 61 and lock washers 62. The fuselage 10 is pivotally mounted upon the journals 43 and 51 by means of bearings 63 and 64, to which are welded cross-members 65 and longerons 66. The fuselage 10 is thus free to rotate about its longitudinal axis x—x within the limits of engagement of the lower longerons 66 with the central portion of the forked member 5. This relationship is more clearly shown in Fig. 3.

Fig. 3 is a partial cross-section through the E-shaped member 6 and the steps 15 attached thereto. The forked member 5 is shown in plan profile. The side spacings of the step 15 and the valve 31 are also clearly shown.

In Fig. 4 the bracket 4 and forked member 5 are shown in cross-section. The threaded end of the piston rod 22 is shown secured fast against the gasket 67, which has previously been inserted within the base 24. The aforementioned parts are further fixedly secured together by a cap screw 68 and a lock washer 69. As has been previously stated in Fig. 2, the lower extremity of the forked member 5 terminates in a journal 39 at the top of which is mounted the thrust bearing 38. At the bottom of the journal 39 there are secured by means of a lock nut 70 a plurality of collars 71 of insulating material. Collector rings 72 are fixedly secured in suitable grooves provided in the peripheries of the collars 71. To each ring 72 is soldered or otherwise secured an insulated cable 73, passed through a plug 74 of insulating material for which suitable holes have been provided in the collars 71 and journal 39. Carbon brushes 75 are held in contact with the rings 72 by springs 76 incased in containers 77 of insulating material. Insulated cables 78 are soldered to the outer extremities of metallic terminals 79, which are an integral part of the brushes 75. The cables 78 pass through the conduit 80, fixedly secured to the base 24 by means of a lock nut 81, from whence they pass to an electric switch concealed within the steps 3, as shown in Fig. 2. There is pivotally secured to the forked member 5, by means of mounting lugs 82 and a pin 83, a rocker arm 84. A disc 85 is pivotally secured to the fork-shaped upper extremity of the arm 84 by means of a pin 86. The lower extremity of the arm 84, terminates in a ball and socket lug 87 and a projection 88. The ball-shaped upper extremity of a rod 89 is pivotally and rotatably secured to the lug 87 by means of a lock nut 90. The lug-shaped lower extremity of the rod 89 is pivotally secured to the fork-shaped extremity of a rocker arm 91 by means of a pin 92. The spring 93 is pivotally secured in suitable holes provided in the projection 88 and mounting lug 94. The other extremity of the arm 91 is fixedly secured to a shaft 95 by means of a pin 96. The shaft 95 is rotatably supported at its inner end by mounting lugs 97, which are an integral part of the base 24 and at its outer end by the control valve 31.

Returning to Fig. 2, the insulated cables 78 attached to the carbon brushes 75 are led through the conduit 80 into the top of an electric switch 98 located within the steps 3. Insulated cables 99 attached to the electric motor of the air compressor unit 32 are led into the top of an electric switch 100 located to the immediate right of the switch 98. The switch 98 is provided with a starting button 101 and a stopping button 102. The switch 100 is likewise provided with a starting button 103 and a stopping button 104. Insulated cables 105 and 106, emerging from the bottoms of the switches 98 and 100, are connected with a power source.

Returning to Fig. 3, the outer end of shaft 95 is fixedly attached to a key 107, shown in Figs. 5 through 7, located within the body of the control valve 31. A portion of the steps 3 has been cut away to show the side profile of the switch 100. An end view is shown of containers 77 and terminals 79 from which the insulated cables 78 lead directly into the conduit 80.

Figs. 5 through 7 represent diagrammatically various settings of the key and parts of the valve 31. These settings correspond to three fuselage positions simulating maximum climb, level flight and maximum dive of an airplane. As has been previously stated, the arm 91 is inter-connected with a key 107 of the valve 31. Fig. 4 shows in detail how the arm 91 is made to follow the movements of the E-shaped member 6, the bottom surface of which is parallel to the longitudinal axis x—x of the fuselage 10.

In Fig. 5 the arm 91 is shown above a horizontal line passed through the center of the key 107, indicating that the fuselage 10 is in a position simulating climb. It will be noted that air from the compressor unit 32 has unobstructed passage through the port 108 into the hoist 21, resulting in upward movement of the piston rod 22.

In Fig. 6 the arm 91 is shown in a horizontal position, indicating that the fuselage 10 is in a position simulating level flight. The body of the key 107 prevents passage of air through the valve 31, which results in the piston rod 22 being held stationary.

In Fig. 7 the arm 91 is shown below a horizontal line passed through the center of the key 107, indicating that the fuselage 10 is in a position simulating dive. It will be noted that air from the hoist 21 has unobstructed passage through the port 109 and the opening 110 into the atmosphere, resulting in downward movement of the piston rod 22.

Fig. 8 illustrates the flight trainer in an attitude of power glide. The elevators 20 are depressed below neutral, bringing about elevation of the rear end of the fuselage 10. The fuselage 10 is in the process of descent and has reached a point approximately midway between full upward and downward travel. It will be noted that the leading edge of the wing 11 is held relatively parallel to the top surface of the platform 2.

My device is operated in the following manner. The operator enters the fuselage 10 and is instructed in the use of the motor and air controls, which are substantial duplicates of the controls installed in a conventional airplane. The fusalage 10 is then balanced about its lateral axis $y$—$y$, through proper adjustment of the counterweight 9 and the operator strapped or otherwise secured to his seat. The compressor unit 32 and motor 47 are then set into operation by means of the starting buttons 101 and 103. By proper manipulation of his controls the operator may then "take-off", "climb", describe right and left hand "banks", "dive", "zoom," etc., in simulation of the maneuvers of an airplane. The fuselage 10 is brought to a state of rest by means of stopping buttons 102 and 104.

I claim:

1. In an apparatus of the class described, comprising a seat for a person, a support for said seat including a movable portion pivotally attached to said seat and a fixed portion, power means carried by said movable portion and operable independently of said seat for effecting an airstream and means carried by said seat and responsive to said air-stream for rotating said movable portion and attached seat about said fixed portion.

2. An apparatus of the class described, comprising a seat for a person, a movable support pivotally attached to said seat, a fixed support for sustaining said movable support and attached seat, power means carried by said movable support and operable independently of said seat for effecting an air-stream, and means carried by said seat and responsive to said air stream for rotating said movable support and attached seat.

3. An apparatus of the class described, comprising a seat for a person, a movable support pivotally attached to said seat, a fixed support for sustaining said movable support and attached seat, means responsive to pitching movement of said seat and effecting a relative movement between said movable and fixed supports for raising or lowering said seat, power means carried by said movable support and operable independently of said seat for effecting an air-stream, and means carried by said seat and responsive to said air-stream for rotating said movable support and attached seat.

4. An apparatus of the class described, comprising a seat for a person, a movable support pivotally attached to said seat, a fixed support for sustaining said movable support and attached seat, fluid actuated means responsive to pitching movement of said seat and effecting a relative movement between said movable and fixed supports for raising or lowering said seat, power means carried by said movable support and operable independently of said seat for effecting an air-stream, and means carried by said seat and responsive to said air-stream for rotating said movable support and attached seat.

5. An apparatus of the class described, comprising a seat for a person, a movable support pivotally attached to said seat, a fixed support for sustaining said movable support and attached seat, a fluid hoist responsive to pitching movement of said seat and effecting a relative movement between said movable and fixed supports including fluid supply and control means for raising or lowering said seat, power means carried by said movable support and operable independently of said seat for effecting an air-stream, and means carried by said seat and responsive to said air-stream for rotating said movable support and attached seat.

6. An apparatus of the class described, comprising a seat for a person, a movable support pivotally attached to said seat, a fixed support for sustaining said movable support and attached seat, a fluid hoist responsive to pitching movement of said seat and effecting a relative movement between said movable and fixed supports, means for supplying fluid under pressure, a fluid supply control means, power means carried by said movable support and operable independently of said seat for effecting an air-stream, and means carried by said seat and responsive to said air-stream for rotating said movable support and attached seat.

7. An apparatus of the class described, comprising a seat for a person simulating an airplane, a movable support permitting rotation of said seat about its lateral axis, a fixed support for sustaining said movable support and attached seat, a fluid hoist interposed between said movable and fixed supports, means for supplying fluid under pressure, a fluid supply control means mounted on said movable support and directly actuated by movement of said seat about its lateral axis, power means carried by said movable support and operable independently of said seat for effecting an air-stream, and means carried by said seat and responsive to said air-stream for rotating said movable support and attached seat.

8. An apparatus of the class described, comprising a seat for a person simulating an airplane, a movable support permitting rotation of said seat about its lateral and longitudinal axes, a fixed support for sustaining said movable support and attached seat, a fluid hoist interposed between said movable and fixed supports, means for supplying fluid under pressure, a fluid supply control means mounted on said movable support and directly actuated by movement of said seat about its lateral axis, power means carried by said movable support and operable independently of said seat for effecting an air-stream, and means carried by said seat and responsive to said air-stream for rotating said movable support and attached seat.

9. An apparatus of the class described, comprising a seat for a person simulating an airplane, a movable support permitting rotation of said seat about its lateral, longitudinal and vertical axes, a fixed support for sustaining said movable support and attached seat, a fluid hoist interposed between said movable and fixed supports, means for supplying fluid under pressure, a fluid supply control means mounted on said movable support and directly actuated by movement of said seat about its lateral axis, power means carried by said movable support and operable independently of said seat for effecting an air-stream, and means carried by said seat and responsive to said air-stream for rotating said movable support and attached seat.

10. An apparatus of the class described, comprising a seat for a person simulating an airplane, a movable support having a horizontal member and a vertical member pivotally connected to said seat, a fixed support for sustaining said movable support and attached seat, a fluid hoist interposed between said vertical member and said fixed support, means for supplying fluid under pressure, a fluid supply control means mounted on said vertical member and engaging said horizontal member in such a manner that movement of said seat about its lateral axis will actuate said control means, power means carried by said horizontal member and operable independently of said seat for effecting an air-stream, and means carried by said seat and responsive to said air-stream for rotating said movable support and attached seat.

11. An apparatus of the class described, comprising a seat for a person simulating an airplane, a horizontal member pivotally supporting said seat about its longitudinal axis, a vertical member attached to said horizontal member and pivotally supporting said seat about its lateral axis, a fixed support attached to said vertical member and pivotally supporting said seat about its vertical axis, a fluid hoist interposed between said vertical member and said fixed support, means for supplying fluid under pressure, a fluid supply control means mounted on said vertical member and engaging said horizontal member in such a manner that movement of said seat about its lateral axis will actuate said control means, power means carried by said horizontal member and operable independently of said seat for effecting an air-stream, and means carried by said seat and responsive to said air-stream for rotating the aforementioned members and seat.

12. An apparatus of the class described, comprising a seat for a person having the supporting and control surfaces of an airplane, a movable support hidden from the pilot's vision having a horizontal member and a vertical member pivotally connected to said seat, a fixed support for sustaining said movable support and attached seat, and a motor and propeller mounted upon said horizontal member for effecting an air-stream, the said control surfaces being responsive to the said air-stream for rotating said seat.

13. An apparatus of the class described, comprising a seat for a person having the supporting and control surfaces of an airplane, including a wing and ailerons attached thereto, a movable support hidden from the pilot's vision having a horizontal member and a vertical member pivotally connected to said seat, a fixed support for sustaining said movable support and attached seat, and a motor and propeller mounted upon said horizontal member for effecting an air-stream, said ailerons being responsive to said air-stream for rotating said seat about its longitudinal axis.

14. An apparatus of the class described, comprising a seat for a person having the supporting and control surfaces of an airplane, including a stabilizer and elevators attached thereto, a movable support hidden from the pilot's vision having a horizontal member and a vertical member pivotally connected to said seat, a fixed support for sustaining said movable support and attached seat, and a motor and propeller mounted upon said horizontal member for effecting an air-stream, said elevators being responsive to said air-stream for rotating said seat about its lateral axis.

15. An apparatus of the class described, comprising a seat for a person having the supporting and control surfaces of an airplane, including a fin and a rudder attached thereto, a movable support hidden from the pilot's vision having a horizontal member and a vertical member pivotally connected to said seat, a fixed support for sustaining said movable support and attached seat, and a motor and propeller mounted upon said horizontal member for effecting an air-stream, said rudder being responsive to said air-stream for rotating said seat about its vertical axis.

16. An apparatus of the class described, comprising a seat for a person having the surfaces and controls of an airplane, a horizontal member for pivotally supporting said seat about its longitudinal axis and having a motor and propeller for effecting an air-stream and counterweights for balancing said seat about its lateral axis, a vertical member attached to said horizontal member and pivotally supporting said seat about said lateral axis, a fixed support attached to said vertical member and pivotally supporting said seat about its vertical axis, and means responsive to pitching movement of said seat and effecting relative movement between said vertical and said fixed supports for bodily raising, holding or lowering said seat with reference to said fixed support.

17. An apparatus of the class described, comprising a seat for a person having the surfaces and controls of an airplane, a horizontal member for pivotally supporting said seat about its longitudinal axis and having a motor and propeller for effecting an air-stream and counterweights for balancing said seat about its lateral axis, a vertical member attached to said horizontal member and pivotally supporting said seat about said lateral axis, a fixed support attached to said vertical member and pivotally supporting said seat about its vertical axis, and means for automatically, bodily raising, holding or lowering said seat following placement of the said seat in attitudes of climb, level flight, or dive, respectively.

18. An apparatus of the class described, comprising a seat for a person having the surfaces and controls of an airplane, a horizontal member for pivotally supporting said seat about its longitudinal axis and having a motor and propeller for effecting an air-stream and counterweights for balancing said seat about its lateral axis, a vertical member attached to said horizontal member and pivotally supporting said seat about said lateral axis, a fixed support attached to said vertical member and pivotally supporting said seat about its vertical axis, and means for automatically, bodily holding said seat against raising or lowering during maneuvers of said seat simulating right turning, straight away or left turning flight of an airplane at constant attitude.

19. An apparatus of the class described, comprising a seat for a person having the surfaces and controls of an airplane, a horizontal member for pivotally supporting said seat about its longitudinal axis and having a motor and propeller for effecting an air-stream and counterweights for balancing said seat about its lateral axis, a vertical member attached to said horizontal member and pivotally supporting said seat about said lateral axis, a fixed support attached to said vertical member and pivotally supporting said seat about its vertical axis, and means for automatically and bodily raising said seat during maneuvers of said seat simulating right spiral climb, left spiral climb, straight-away climb, or zoom of an airplane.

20. An apparatus of the class described, comprising a seat for a person having the surfaces and controls of an airplane, a horizontal member for pivotally supporting said seat about its longitudinal axis and having a motor and propeller for effecting an air-stream and counterweights for balancing said seat about its lateral axis, a vercal member attached to said horizontal member and pivotally supporting said seat about said lateral axis, a fixed support attached to said vertical member and pivotally supporting said seat about its vertical axis, and means for automatically and bodily lowering said seat during maneuvers of said seat simulating right spiral glide, left spiral glide, straight-away glide, or dive of an airplane.

WILLIAM E. HUFFMAN.